United States Patent [19]

Abderhalden

[11] 3,876,258

[45] Apr. 8, 1975

[54] PNEUMATIC SUCTION CONVEYOR

[75] Inventor: Johann Heinrich Abderhalden, Dietikon, Switzerland

[73] Assignee: Swiss Aluminium Ltd., Chippis, Switzerland

[22] Filed: Mar. 15, 1973

[21] Appl. No.: 341,349

[30] Foreign Application Priority Data

Mar. 24, 1972  Switzerland................... 04380/72

[52] U.S. Cl......................... 302/11; 37/65; 37/189; 214/17 DB; 302/58
[51] Int. Cl............................................. B65g 53/24
[58] Field of Search.... 214/17 DB; 302/5, 7, 11–13, 302/15, 36, 56, 58; 37/65, 66, 189, 190

[56] References Cited
UNITED STATES PATENTS

| 887,085 | 5/1908 | Gardner | 302/13 X |
|---|---|---|---|
| 954,171 | 4/1910 | Crook | 302/5 |
| 1,530,654 | 3/1925 | Daley | 302/58 X |
| 2,148,501 | 2/1939 | Rasor | 302/58 |
| 2,580,306 | 12/1951 | Leach et al. | 302/11 X |
| 2,783,098 | 2/1957 | Rooney et al. | 302/58 |
| 2,801,137 | 7/1957 | Clay | 302/56 |
| 3,089,733 | 5/1963 | Natanson | 302/56 |
| 3,298,747 | 1/1967 | Beckett et al. | 302/58 |

FOREIGN PATENTS OR APPLICATIONS

| 1,634,990 | 2/1971 | Germany | 302/58 |
| 387,127 | 12/1923 | Germany | 302/58 |

Primary Examiner—Evon C. Blunk
Assistant Examiner—W. Scott Carson
Attorney, Agent, or Firm—Ernest F. Marmorek

[57] ABSTRACT

This invention relates to a pneumatic suction conveyor for loose material, including a suction head with a downwardly open inlet, and a feeder adjacent to this inlet; the feeder consisting of at least two rotors for loosening the material, each rotor consisting of blades existing from a shaft to a greater radius than the shaft, with means for rotating each rotor about its own axis and means for imparting bodily motion to the rotors in a path around the suction head, and at least one elongated auxiliary conveyor device, adjustable in direction relative to the suction head and having an output end located so as to deliver material to the said path.

13 Claims, 4 Drawing Figures

PNEUMATIC SUCTION CONVEYOR

The invention relates to a pneumatic suction conveyor for loose material, including a suction head with a downwardly open inlet, and a feeder adjacent to this inlet, the feeder including rotors which serve to loosen the material in bulk and to supply the material to the suction head.

Pneumatic suction conveyors are known which include a vertical suction pipe with a suction opening below, an air supply channel leading into the neighbourhood of the suction opening, and supply discs having an arrangement of blades. For supply of the material to the suction opening of the suction pipe there usually serve two supply discs arranged laterally of the nozzle, each driven by a motor, which take up the material and carry it to the suction opening. The suction conveyors serve essentially for unloading of powdery materials, not freely flowing, from large storage spaces, especially from holds of ships, and are for example suspended on swingable jibs of cranes or on portal cranes.

The supply of the loose material to the suction head of the pneumatic conveyor has appeared in many cases to be insufficient, because the material does not of itself flow continuously to the suction head, and the known auxiliary means for eliminating this disadvantage, as for example the arrangement of supply discs rotating about stationary axes in the near neighbourhood of the suction head, have shown themselves to be insufficiently effective, especially in the emptying of relatively large storage spaces.

These supply discs have also the disadvantage that, by reason of their relatively large surface, they can only be inserted into the loose material with a large expenditure of energy. Consequently the supply of loose material to the suction head is very much impaired, because the material can receive the loosening necessary for the suction operation only in the range of the at times very limited penetration of the supply discs into the material.

Underlying the present invention is the task of providing a supply device for a suction head of a pneumatic suction conveyor for loose material, with which the previously described disadvantages attached to the known supply devices are avoided, in other words of producing a supply device by which the suction head can be provided more effectively than hitherto with loosened loose material.

In accordance with the invention this task is solved in that each rotor consists of blades extending from a shaft to a greater radius than the shaft and there is means for rotating each rotor about its own axis and means for imparting bodily motion to the rotors in a path around the suction head, and at least one elongated auxiliary conveyor device, adjustable in direction relative to the suction head and having an output end located so as to deliver material to the said path.

The accompanying drawings show one example of a conveyor embodying the present invention in a simplified diagrammatic manner. In these drawings.

Figure 3:
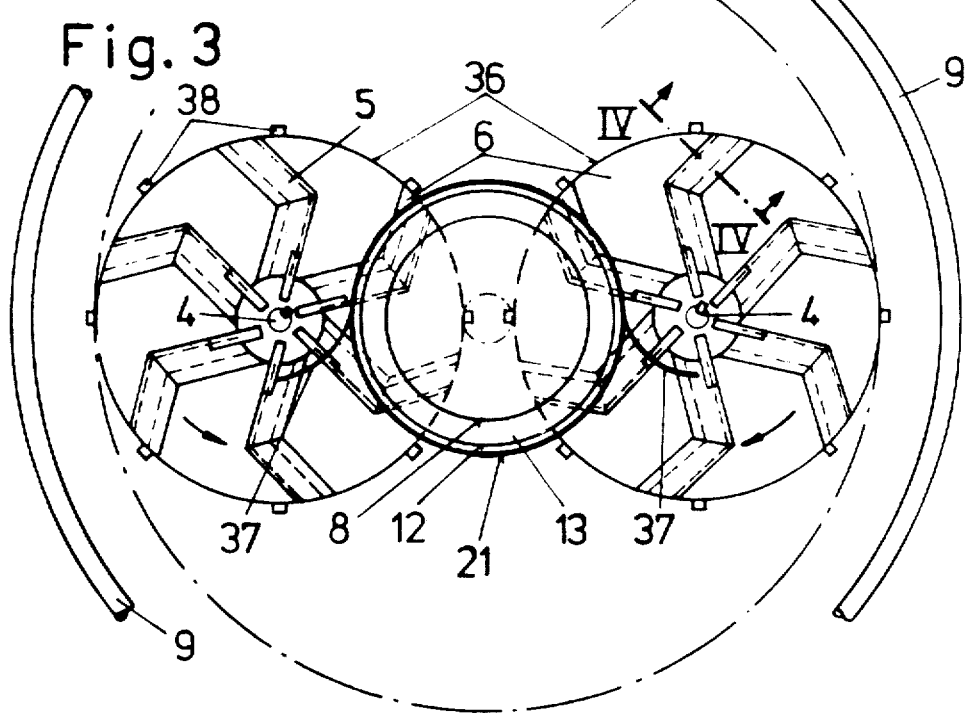
FIG. 3 is a plan of the rotors on a larger scale.
Figure 4:
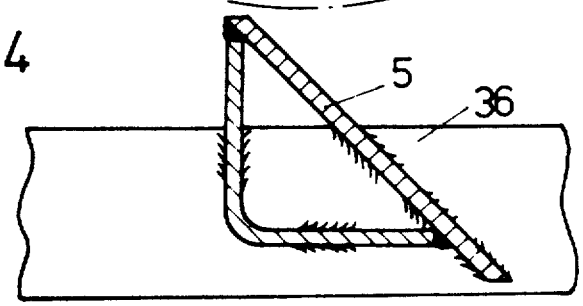

FIG. 4 a section through a blade of a rotor on the line IV—IV in FIG. 3, further enlarged.

Figure 1:
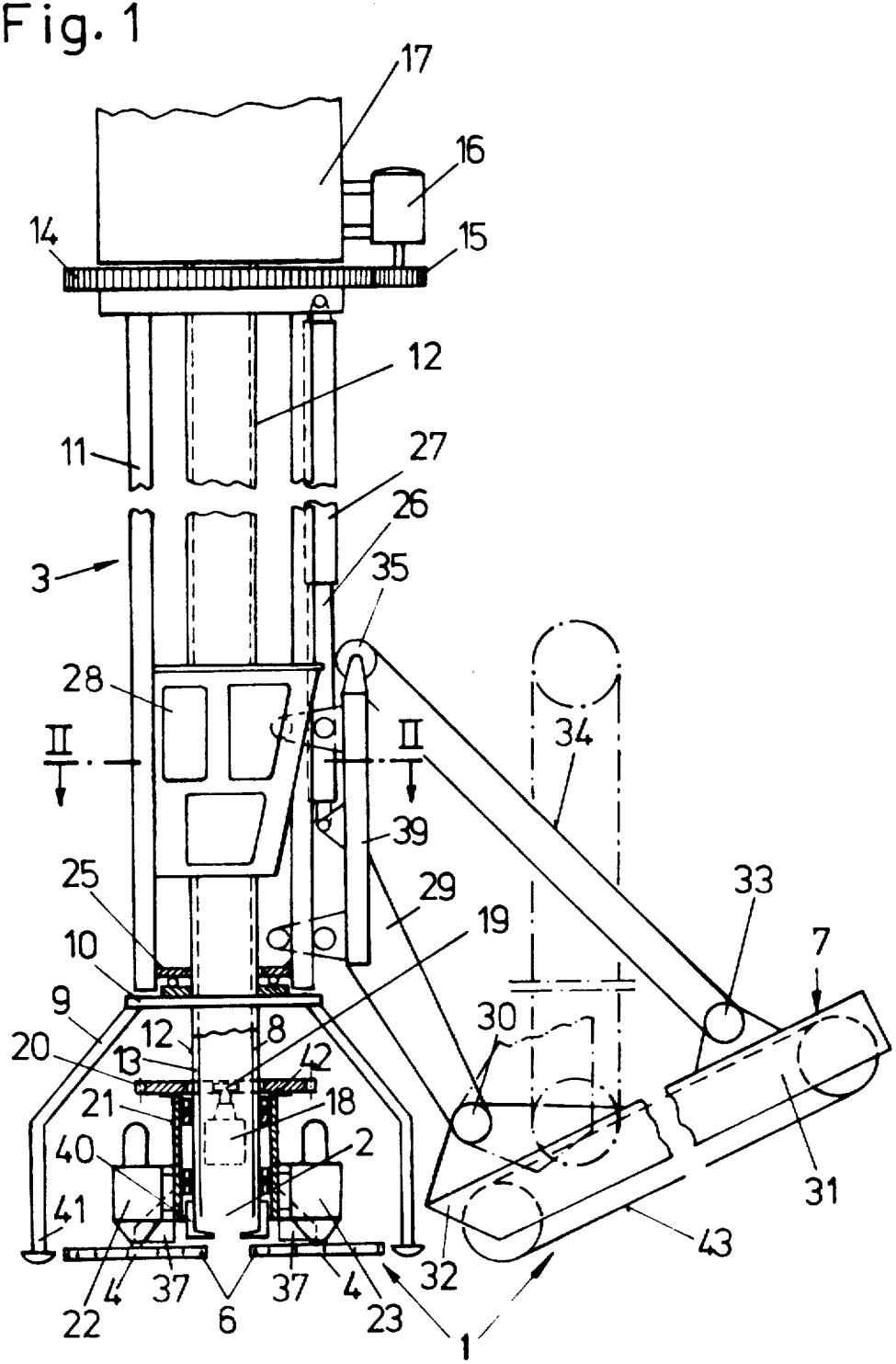
FIG. 1 is a side elevation of the conveyor with parts in vertical section.
Figure 2:
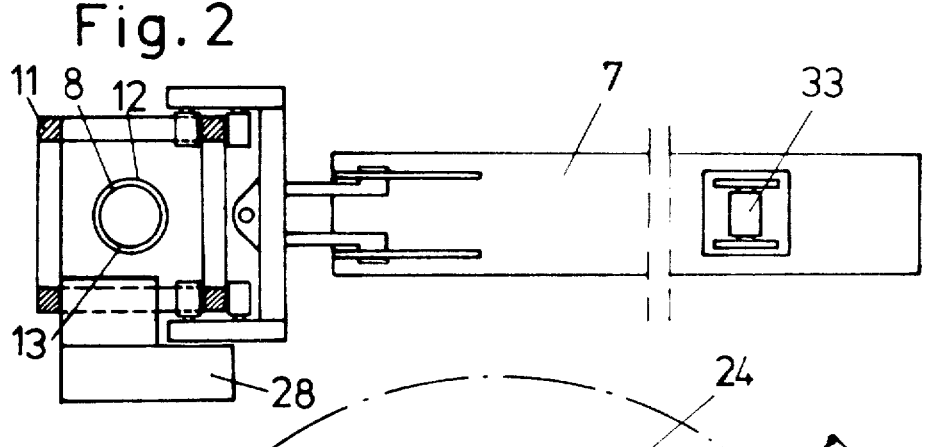
FIG. 2 is a section on the line II—II in FIG. 1.

FIG. 1 shows a suction head 2 of a pneumatic suction conveyor 3 for loose material, and a feeder 1 arranged adjacent to the suction head 2. The feeder includes two rotors 6 each rotatable about an axis 4 and provided with blades 5, and serving for supply of the material to the suction head 2. The feeder also includes an auxiliary conveyor 7, which is adjustably mounted as described more fully later.

The suction conveyor 3 has a suction pipe 8, which is surrounded by an outer pipe 12, which forms with the suction pipe 8 an annular channel 13, through which, in known manner, air can reach the suction head 2, even when the head 2 is immersed in loose material. The pipes 8, 12 are fixed at their upper ends to a carrier pipe 17, not shown in detail. This may, for example, be suspended from the jib of a crane. The pipes 8, 12 form together a carrier column for the other parts shown of the suction conveyor 3. To increase the load-bearing ability of the column there can in addition be a carrier frame, if this is desired. An annular plate 10 is fixed to the outer pipe 12, and a frame is fixed to the plate 10. This frame has supporting legs 41 extending downwards slightly beyond the rotors 6. After emptying of a storage space, these legs come into engagement with the floor of the latter, and then support the suction head 2 with the rotors 6 and the auxiliary conveyor 7, so that no contact occurs with the floor of the storage space, and consequently no damage can occur to the rotors and the conveyor 7.

On the annular plate 10 there is journalled, with the help of an axial bearing 25, a rotary support 11 surrounding the suction pipe 8. The rotary support 11 carries a gear ring 14 in engagement with pinion 15 driven by motor 16, which is fastened to the carrier pipe 17. A carrier pipe 21 is journalled to rotate on the pipe 12 through bearings 42. To this pipe 21 are fixed housings for motors 22, 23 for driving the rotors 6. The rotors 6 are journalled, in a manner not shown in more detail, on the housings of the motors 22, 23, and are preferably driven in opposite directions of rotation as indicated by arrows in FIG. 3.

A further motor 18 is secured to the frame 4 beneath the annular plate 10, and drives the pipe 21 through a pinion 19 and a gear ring 20. A motion is imparted to the rotors by the driving motor 18, in an endless path 24 extending around the axis of the suction pipe 8, in which the rotors 6, considered in plan as in FIG. 3, partly overlap the inlet of the suction head 2. In a manner not shown, a switching device can be arranged on the driving motor 18, by which a to and fro motion in an arc may be imparted to the rotors 6 in the endless path 24.

At the inlet there is provided an adjusting device 40 for varying the breadth of opening of the inlet, which serves for control of the quantity conveyed.

A supporting frame 39 with an arm 29 is guided to reciprocate in the vertical direction on the rotary support 11. On the lower end of the arm 29 there is a joint 30, through which the auxiliary conveyor 7 is pivotally connected with the arm 29. In order to be able to raise and lower the conveyor 7, or to hold it in various raised positions, a hydraulic actuating cylinder 27 is fixed in the upper part of the rotary support 11, while an associated piston rod 26 is connected with the supporting frame 39. In addition a cabin 28 containing a control station is secured on the rotating support 11, from which the individual operations can be controlled and observed. Alternatively the cabin 28 can also be fixed, in a manner not shown in more detail, on the supporting frame 39 of the conveyor 7, thus ensuring the maintenance of a most suitable spacing between the cabin 28 and the conveyor 7 for observation of the operations.

The auxiliary conveyor 7, formed as a motor-driven chain conveyor, has a supporting frame 31, which at one end is connected via the joint 30 with the arm 29 of the supporting frame 39. At a distance from the joint 30 there is mounted on the frame 31 a pulley 33, connected via a rope 34 with a winch 35 fastened on the supporting frame 39. This winch is driven by an electric motor in such a way that the supporting frame 31 of the conveyor 7 can be swung so far about the pivot 30 that it assumes a vertical position. This ensures that the supporting frame 31 of the conveyor 7 can lie throughout its entire length on the surface of the loose material present in the storage space.

In the example shown, the conveyor 7 is an endless conveyor in the form of a circulating conveyor belt 43, which, in a manner not shown in more detail, has scraper blades fixed to its outer face.

The blades 5 on the rotors 6 are arranged inclined to the plane of rotation of the rotors in such a way that the latter convey the material in the direction from below upwards and thus penetrate into the material with simultaneous loosening of the latter. The tips of the blades 5 are fixed to a ring 36 concentric with the shaft 34. Teeth 38 are fixed to the outer surface of the ring 36, by which the material lying at the outer circumference of the ring 36 is loosened or stirred. This reduces the power required from the motor 18 for the bodily motion of the rotors 6. Just above each rotor 6, guide plates 37 are fixed on the carrier pipe 21, which direct to the suction head the material loosened by the rotor 6.

As compared with the supply discs hitherto known in association with the suction heads of suction conveyors, the rotors 6 can be introduced into the loose material without a relatively large expenditure of energy, so that the conveyance of the loose material to the suction head can be accomplished significantly more effectively than hitherto. Moreover the auxiliary conveyor 7 is very advantageous, because with it a relatively great annular zone on the surface of the loose material surrounding the suction pipe inlet can be drawn in.

As an alternative to the example shown, there can be two opposite auxiliary conveyors 7, or more, or the rotary support 11, in order in this way to avoid the suction pipe 8 being deflected in undesired manner by forces acting one-sidedly from only one conveyor.

In place of the belt conveyor, the auxiliary conveyor 7 may be any other form of elongated conveyor, e.g. a screw conveyor.

In operation, in unloading a bulk of material from a storage space, the suction head is lowered into the material and penetrates a considerable distance beneath the surface, while the auxiliary conveyor is adjusted to operate on the surface of the material, and is traversed around the pipes 8, 12, so that all material within range of the conveyor 7 is brought to the suction head.

What we claim is:

1. In a fluid device for conveying loose material having a vertically movable frame,
in combination,
fluids feeding means having a central substantially vertical axis and being carried by said frame in fixed relation thereto and operable to receive and to convey said material,
auxiliary transporting means comprising a rotor journalled with relation to said frame and rotatable about said axis, and
a conveyor connected to said rotor and being rotatable with said rotor about said axis and normally disposed radially of said frame and in contact with material outside said feeding means and operable to have its position peripherally of said axis adjusted by said rotor,
said conveyor including endless conveying means normally positioned radially with respect to said feeding means and operable for conveying said outside material towards said feeding means.

2. A device according to claim 1, in which the said feeding means include a suction head and cutters and means for imparting bodily motion to said cutters arranged to move each cutter to and fro in an arc relatively to the suction head.

3. A device according to claim 2, in which the suction head terminates in a vertical pipe having an open lower end constituting an inlet, and the axis of each cutter is vertical.

4. A device according to claim 3, in which there are two cutters, and the means for rotating them causes them to rotate in opposite directions as seen in plan.

5. A device according to claim 3 including means for adjusting the size of the inlet.

6. A device according to claim 2, in which the blades of each cutter are inclined to the plane of rotation of that cutter.

7. A device according to claim 2, in which just above each cutter guide plates are fixed.

8. A device according to claim 1, including a control station mounted on said rotor adapted to accommodate an operator for observing and operating.

9. A device according to claim 1, in which the conveyor is carried by an auxiliary frame which is mounted to reciprocate vertically relatively to the rotor.

10. A device according to claim 9, in which the conveyor adjacent to its output end is pivoted to the auxiliary frame.

11. In a device, as claimed in claim 1, said conveyor further comprising
a housing supporting said conveyor
a supporting arm secured with relation to said rotor and pivoted to said housing;
a guide pulley mounted with relation on said rotor; and
a winch operably connected to said guide pulley and a flexible transmission means supported by said guide pulley and to said housing whereby the position of the conveyor may be adjusted.

12. A pneumatic suction conveyor for loose material, including a section head with a downwardly open inlet, and a feeder adjacent this inlet; the feeder including at least two rotors for loosening the material, each rotor comprising blades extending from a shaft to a greater radius than the shaft, with means for rotating each rotor about its own axis, said blades of each rotor being inclined to the plane of rotation of that rotor and including a ring fixed to the tips of said blades and means for imparting bodily motion to the rotors in a path around the suction head, and at least one elongated auxiliary conveyor device, adjustable in direction relative to the suction head and having an output end located so as to deliver material to the said path.

13. A conveyor according to claim 12, in which each ring carries external teeth.

* * * * *